United States Patent [19]

Bubik et al.

[11] 4,375,231
[45] Mar. 1, 1983

[54] TIRE REPAIR CONSTRUCTION AND METHOD

[75] Inventors: Leslie Bubik, Toronto; Stanley D'Souza, Richmond Hill, both of Canada

[73] Assignee: Vulcan Equipment Company, Ltd., Ontario, Canada

[21] Appl. No.: 239,333

[22] Filed: Mar. 2, 1981

[51] Int. Cl.³ .......................... B60C 21/06; B29H 5/16
[52] U.S. Cl. ........................................ 152/370; 156/97
[58] Field of Search .................. 152/367, 370; 156/95, 156/97, 98; 264/36; 425/11, 17, 23, 24

[56] References Cited

U.S. PATENT DOCUMENTS

| | | | |
|---|---|---|---|
| 1,591,817 | 7/1926 | Hawkinson | 152/367 |
| 2,421,096 | 5/1947 | Vogt . | |
| 2,483,010 | 9/1949 | Hooper . | |
| 2,802,506 | 8/1957 | Agle et al. | 156/97 |
| 3,143,156 | 8/1964 | Fagert et al. . | |
| 3,251,721 | 5/1966 | Johnson . | |
| 3,369,586 | 2/1968 | Gottauf . | |
| 3,919,021 | 11/1975 | Whittle . | |
| 3,996,085 | 12/1976 | Barnes et al. | 156/97 |
| 4,109,697 | 8/1978 | Wolfe | 152/367 |

Primary Examiner—Michael W. Ball
Attorney, Agent, or Firm—Hosier, Niro & Daleiden

[57] ABSTRACT

A repair construction and method are disclosed for repairing a damaged portion in the wall of a tire. A patch is installed over the damaged portion on the inside of the tire, and the inside of the tire is pressurized to force the patch into the damaged portion, preferably in a concave shape. The remainder of the plug area then is filled on the outside of the patch with a suitable plug material, and the plug material and patch are then cured while the patch is maintained in position at least partially within the damaged portion. This construction and repair method eliminates bulging on the exterior of the tire after the repair is completed.

12 Claims, 12 Drawing Figures

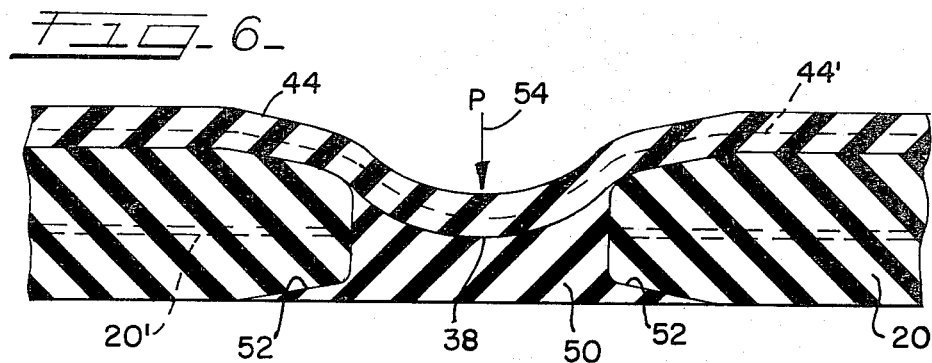
FIG-6-
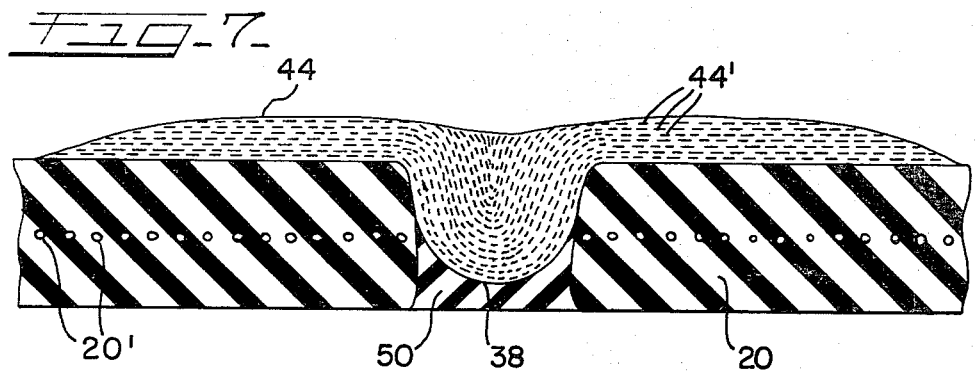
FIG-7-
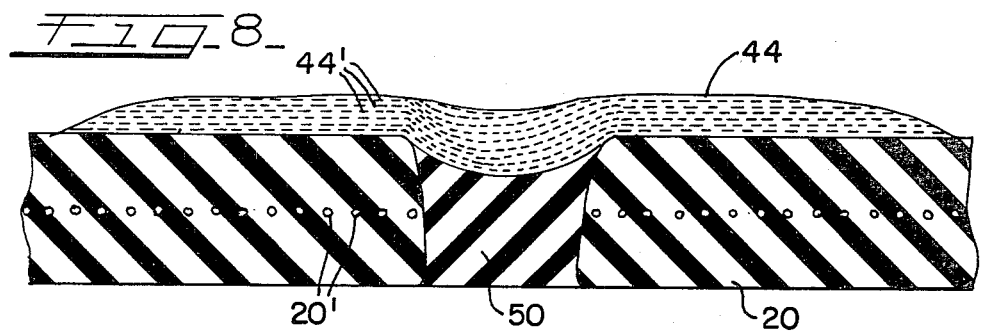
FIG-8-

TIRE REPAIR CONSTRUCTION AND METHOD

BACKGROUND OF THE INVENTION

This invention relates to a repair construction and a method of repairing a damaged portion in the wall of a tire, particularly the sidewall of a radial tire.

Radial tires are constructed with radial wire cords which bear or absorb the loop tension from bead to bead due to internal air pressure when the tire is inflated. When one or more of the radial cords are broken due to tire damage, the loop strength must be restored in that local area in order to restore the proper load carrying capability of the tire.

One method of repairing such damaged areas in the walls of tires is to cut a section of the wall around the damaged portion to form a plug area, placing a patch over the plug area on the inside of the tire, and filling the remainder of the plug area with a plug material, such as uncured rubber. The plug material and patch then are cured to complete the repair except for final dressing.

The principal problem with repairs of the character described resides in the fact that such repairs result in a bulge in the repaired tire when its internal inflated pressure reaches road running conditions, for example, in truck tires a pressure of as much as 100 p.s.i. The bulge is mainly restricted to the plug area and might extend from the normal plane of the tire sidewall as much as one quarter inch or more under pressure. While such a bulge condition may not necessarily create or cause a functional or operational problem, it is totally unacceptable to many tire retailers, truckers and other end-users because the bulge is misconceived as a ply separation and because bulged tires may not pass many local and state inspections.

Various approaches have been attempted by the present inventors to eliminate this bulge problem encountered in tire repair constructions. In particular, different types or compositions of patches have been utilized, such as nylon, uncured rayon, semi-cured rayon, multiple-ply rayon, steel reinforced patches, and the like. Other types of patches have included woven nylon, criss-cross cord patches, and other well known patch materials and configurations. In all these instances, the particular patch material did not solve the bulge problem when the conventional repair method was employed.

Attempts have also been made by the present inventors to vary the modulus of the filler plug material, such as varying the durometer of the uncured plug material. These changes also failed to solve the bulge problem.

Other attempted solutions to the problem by the present inventors included adjusting the pressure differential inside and outside of the tire during curing, as well as varying the curing temperatures, but neither approach was successful in eliminating the resultant, undesirable bulges in the repair area.

Still another suggested solution made by others in the art was to grind or buff out the protruding bulge, but this results in a recess or "dimple" when the tire is uninflated which is a condition equally unacceptable to the retailer or trucker.

SUMMARY OF THE INVENTION

The present invention is directed to a new and improved repair construction and method of repairing a damaged portion in the wall of a tire, and particularly the sidewall of a radial tire, to eliminate the exterior bulge in the repaired area when the tire is subsequently pressurized under normal road running conditions.

In addition, the present invention avoids the unacceptable dimple appearance when the tire is uninflated. This is accomplished primarily by positioning the patch used in the repair in a preselected orientation relative to the injury and maintaining that position or orientation while applying the plug material to the exterior of the injury and during curing of the repair.

An object, therefore, of the present invention is to provide a new and improved method of repairing a damaged portion in the wall of a tire, such as a sidewall injury in a radial tire.

Another object of the invention is to provide a repair construction and a method of repairing a defective tire, of the character described, without causing a bulge at the repaired area after the repair is completed and when the repaired tire is subjected to normal pressurized road running conditions.

In the exemplary embodiment of the invention, the method of repair includes the following operational sequence. First, a section of the wall of the tire around the damaged portion is removed to form a plug area. A patch is then installed over the plug area on the inside of the tire in an unstressed state substantially contiguous with the interior surface of the tire. The patch is then positioned at least partially within the plug area of the tire wall by the application of force on its internal surface, preferably by pressurizing the tire. The remainder of the plug area is then filled on the outside of the patch with a suitable plug material, such as uncured rubber, and the plug material and patch are cured while the patch is maintained in its prepositioned orientation within the plug area. With this method and repair construction, the tire is cured with internal air pressure applied while the patch is still oriented or positioned at least partially within the plug area.

In a preferred embodiment of the invention, the interior surface of the tire around the plug area is recessed, by buffing the tire's inner liner, and the patch is installed in substantially smooth and continuous contact with the interior surface of the tire in an unstressed state. The patch is then positioned at least partially within the plug area, that is, outwardly beyond the plane of the inside surface of the tire wall, by pre-pressurizing the inside of the tire to approximately 60% to 100% of full tire pressure under normal operation conditions. Uncured plug material is then applied to the exterior of the patch in the plug area and about its periphery generally to a depth equal to the outside profile of the tire. The curing step is then carried out either with substantially equal pressure on the inside and outside of the tire around the plug area, or preferably with internal pressure slightly greater than external pressure. Finally, the outside of the repaired area is dressed after curing so as to form a continuation of the outside profile of the tire across the plug area. Preferably, the dressing step is carried out with the tire inflated.

The repair construction of the present invention comprises a tire wall having a damaged portion defined by a plug area and in which a patch is prepositioned so as to locate at least a portion of the patch, including its inner cords, within the plug area. The repair construction also includes a plug material which fills the remainder of the plug area outside the patch, with the patch and plug material being cured into the tire wall in this placement.

Thus, a new and improved repair construction and method is provided for repairing a damaged portion in the wall of a tire, such as the sidewall of a radial tire, without effecting an outward bulge at the repair on the exterior of the tire after the repair is completed and under normal road running conditions and without a dimple in the repair area when the tire is uninflated.

It should be noted that when practicing the invention in accordance with the preferred embodiments as described below, the bulge/dimple condition is virtually eliminated. With some patch materials particularly cured patches, however, and when practicing the invention at the extremes of the disclosed process parameters, a slight bulge and/or dimple may still persist. In any event, the practice of the present invention will either eliminate or substantially reduce the bulge and dimple found in prior art repairs to such an extent that tires repaired in accordance with the invention will be acceptable for use in the trade.

Other objects, features and advantages of the invention will be apparent from the following detailed description taken in connection with the accompanying drawings.

DESCRIPTION OF THE DRAWINGS

The novel features of the present invention are set forth with particularity in the appended claims. The invention, however, together with its objects and advantages, may be best understood by reference to the following description taken in conjunction with the accompanying drawings, in which like reference numerals identify like elements in the figures and in which:

FIG. 6 is a view similar to that of FIG. 5, illustrating the step of applying filler material in the plug area on the outside of the prepositioned patch;

FIG. 7 is an enlarged circumferential sectional view illustrating a completed repair construction after the patch and filler material have been cured in accordance with the present invention, and illustrating the completed repair construction having used an uncured patch material;

FIG. 8 is a view similar to that of FIG. 7 illustrating the completed repair construction of the present invention having used a cured patch material;

DETAILED DESCRIPTION OF THE INVENTION

Figure 1:
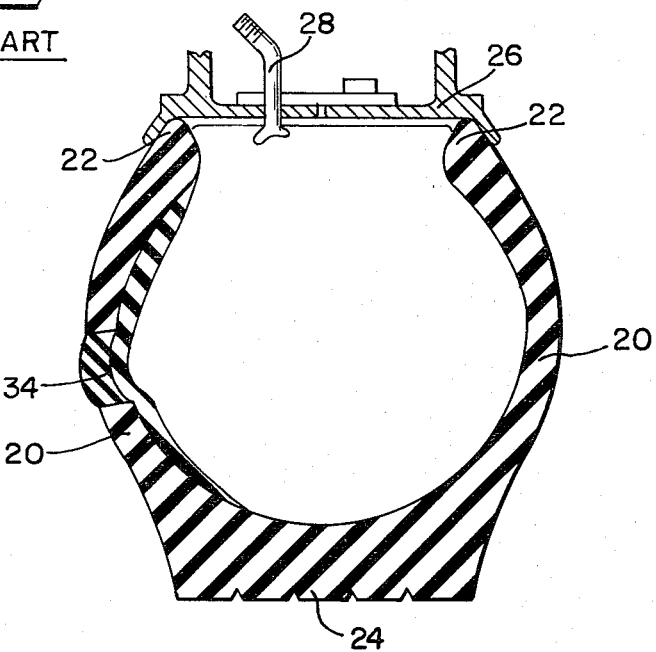
FIG. 1 is a sectional view radially through a tire having a sidewall repair construction in accordance with the prior art.

The present invention is shown in the drawings as a repair construction and a method of repairing a damaged portion in the wall of a tire, particularly the sidewall of a radial tire constructed with radial cords which absorb the loop tension from bead to bead due to internal air pressure when the tire is inflated. When the tire is damaged and one or more of the radial cords are broken, the loop strength must be restored in that local area in order that the tire retain its required load carrying capability.

Figure 2:
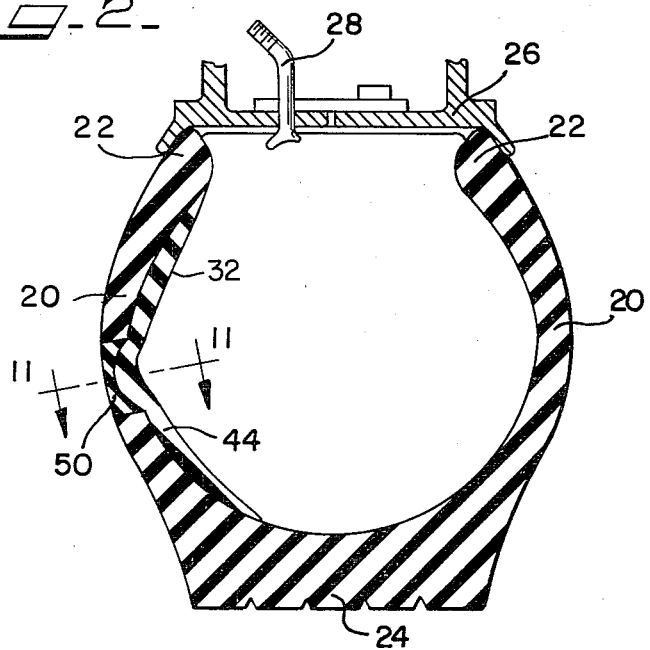
FIG. 2 is a sectional view radially through a tire having a sidewall repair construction in accordance with the present invention.
Figure 3:
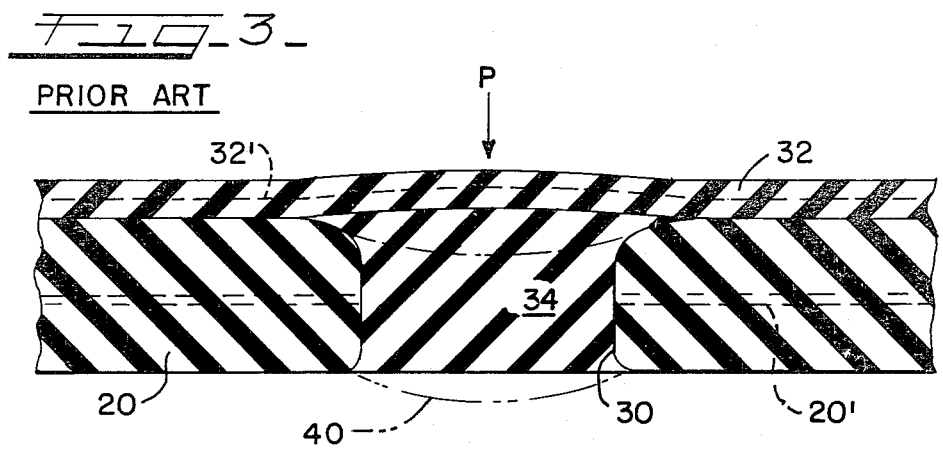
FIG. 3 is an enlarged radial sectional view through the repair construction of the prior art as shown in FIG. 1, with the patch and filler plug shown in full lines in its installed condition, and shown in dotted lines in its inflated, bulged condition.

By way of comparison, FIGS. 1 and 2 show respective tires repaired in accordance with the prior art (FIG. 1) and the present invention (FIG. 2). Each tire includes sidewalls 20 extending between beads 22 and a tread portion 24 of the tire. Through beads 22, the tire is mounted on a rim 26, and an air valve stem 28 extends through the rim for inflating the tire. Referring particularly to FIGS. 1 and 3, a conventional prior art method of repairing damaged areas in the walls of tires first will be described. FIG. 3 shows tire wall 20 with a section of the wall, including the damaged portion, cut out to form a plug area 30. This is a common procedure normally referred to as "skiving" the tire injury. A patch 32 is placed over the plug area on the inside of the tire, and the remainder of the plug area is filled with a plug material 34. The patch cord 32' runs generally parallel to the tire cord 20'. The plug material and patch are then cured to complete the repair construction except for final dressing. To better understand this conventional construction and repair method, it should be noted that the patch is installed on the inside of the tire over the plug area and the plug material is applied to the plug area with the tire in an uninflated condition. As a consequence the patch is positioned either flat across the plug area or possibly with an inward or convex bulge as shown by full lines in FIG. 3. Under the influence of internal tire pressure P, patch 32 assumes a bulge condition generally as shown by the dotted lines 40. The bulge condition is also shown in FIG. 1. By comparison, a typical patch construction in accordance with the present invention is shown at the same location on a tire sidewall in FIG. 2, with no resulting outward bulge even when the internal tire pressure reaches approximately 100 p.s.i., i.e. similar to road running conditions.

Figure 4:
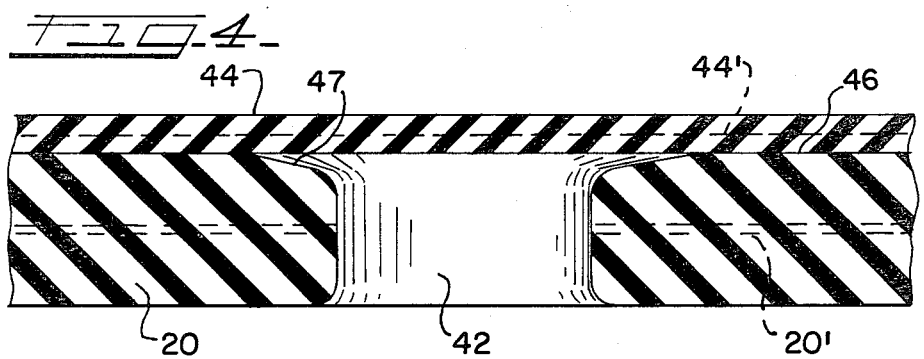
FIG. 4 is an enlarged radial sectional view illustrating a typical tire wall injury and an initial step of installing a patch according to the method of the present invention.

FIGS. 4–7 show the method of tire repair and repair construction as practiced in accordance with the present invention. More particularly, a section of the tire wall including the damaged portion, is preferably removed to form a plug area 42. An application of conventional rubber cement may then be made over the plug area and the inside of the tire around the plug area. A patch 44 is installed over plug area 42 on the inside 46 of the tire in an unstressed state and substantially contiguous with the interior surface of the tire. Again, the patch cord 44' extends generally parallel to the tire cord 20'. To this end, and as illustrated in FIG. 4, the interior surface 46 of the tire around plug area 42 may be skived or recessed, for example by buffing, at 47. Although a variety of patches have been found useful in the present invention, uncured rubber patches having nylon cord have been found most satisfactory.

Figure 5:
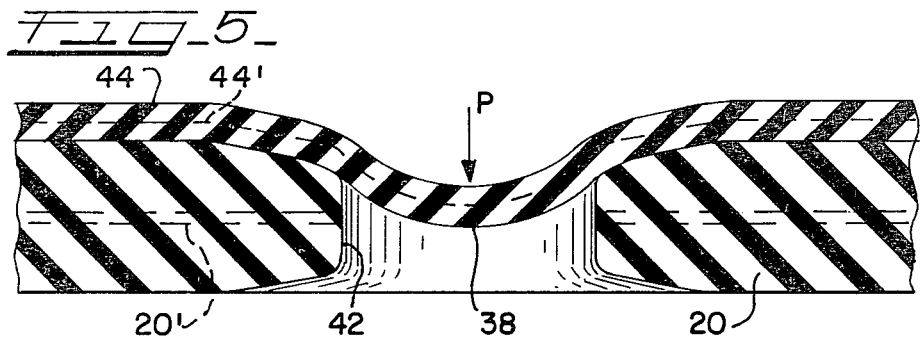
FIG. 5 is a view similar to that of FIG. 4, illustrating the positioning of the patch within the plug area in accordance with the method of the present invention.

Referring to FIG. 5, the next step of the method of the present invention comprises positioning the patch 44 at least partially within plug area 42. Preferably the patch is also shaped during this step of the process to assume a generally concave orientation within the plug area as shown in FIG. 5, in a condition to more readily accommodate tension loads. This preselected orientation of the patch, that is the appropriate positioning and shaping of the patch, has been achieved with internal pressure P within the tire on the order of 60% to 100% of the tire's normal operating pressure.

It has been found that the actual pressure employed with a given tire size and/or patch may vary to some extent, but has been found to fall generally in the noted range. The specific pressure for a given tire size and patch can be determined with little difficulty by routine evaluation. The required pressure is that which forces the patch outwardly beyond the plane of the tire wall inside surface and into the plug area. Preferably, the patch will extend into the plug area to the point where a substantial quantity of cord is actually positioned in the plug area as shown for example in FIG. 7. The apex 38 of the patch, however, should not extend so far as to reach the plane of the exterior surface of the tire wall, and is preferably recessed at least one-eighth inch below the tire's exterior to provide adequate plug material for a long-lasting repair. In any event, it is preferable that the patch positioning pressure be as close to operating pressure without forcing the patch too far into the plug area as just described. By way of example, when a 10.00×20 truck tire is being repaired in accordance with the present invention (an injury plug area of approximately 2.5 inches×0.75 inch) an internal tire pressure of about 65–75 p.s.i. has been found suitable when using an uncured rubber patch with nylon cord, and a pressure of about 100 p.s.i. is satisfactory when using a cured rubber patch also with nylon cord.

The length of time required for the pre-positioning step may also vary and again can be easily determined for a given tire and patch material. Generally, 10–20 minutes is sufficient to properly position the patch in the plug area. However, where possible, such as when using chemically-cured patches, it is recommended and may be necessary in some cases to maintain the pre-positioning internal pressure without interruption until the curing step is completed.

The next step in the process of the present invention, is illustrated in FIG. 6 and comprises filling the remainder of plug area 42 on the outside of patch 44 with a suitable uncured plug material 50, such as uncured rubber. The plug material is preferably applied beyond the plug area 42 to an area 52 which has been lightly buffed and recessed as shown.

The next step comprises curing plug material 50 and patch 44 while the patch and plug material are maintained in proper position. The parameters of the curing procedure are the same as those used in conventional tire repair and are all well known to those skilled in the art. The actual curing process employed will depend upon the nature of the patch used since either uncured, semi-cured or cured patches can be used in practicing the invention. It should be note, therefore, that the term "curing the patch" as used herein is intended to include all of the conventional processes for curing and/or bonding patches of all types onto the wall of a tire. The patch position and shape may be retained during curing by applying pressure to the inside of the tire as illustrated by arrow 54. Since most accepted curing processes also require external pressure to achieve good density in the cured material, a pressure differential is required across the repair area. Generally, the internal pressure should be at least about 10% greater than the external pressure and is preferably between about 10% and 35% greater than the external pressure. It has proven in practice that a pressure differential of 65 p.s.i. inside versus 55 p.s.i. outside is quite effective for a 10.00×20 truck tire.

A final and optional step of the method of the present invention comprises the step of dressing the outer surface of the repair after curing to form a generally smooth and uninterrupted continuation, as at 56, of the outside profile of the tire wall across the plug area.

With the above described method of the present invention, a new and improved tire repair construction is provided as shown in FIGS. 7 and 8 without effecting an outward bulge on the exterior of the tire under normal pressurized road running conditions and without causing a dimple under no-pressure conditions. It is believed that the bulge/dimple problem is eliminated because the patch has been positioned and shaped before application of the plug material and before and during curing so that any deformation of the patch which occurs due to internal pressure is accomodated before the repair is molded in place. In addition, the patch cords, particularly with uncured patches, migrate into the injury and provide a repair construction with enhanced rigidity and resistance to movement relative to the tire wall. Thus, the patch 44 will, after completion of the repair, accept loads without bulging or dimpling as do prior art patches and repair constructions.

Figure 9:
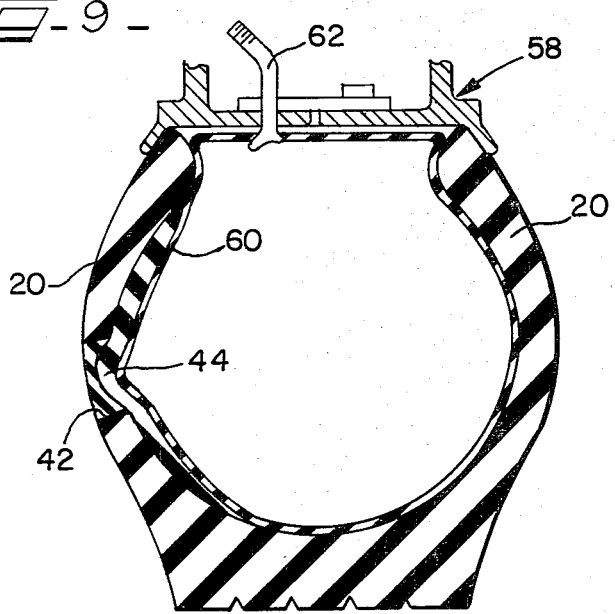
FIG. 9 is a sectional view radially through a tire and associated repair apparatus during the patch positioning step of FIG. 5.

Referring to FIG. 9, a damaged tire and patch 44 are illustrated in conjunction with an apparatus for pressurizing the interior of the tire to pre-position the patch in plug area 42. More particularly, the tire, with the damaged portion skived to form plug area 42, is mounted on a road rim fixture, generally designated 58. An inner tube 60 is disposed within the tire and is inflated through an air valve stem 62 to a desired pressure, such as 75 p.s.i. This forces the patch into the plug area as exemplified in FIG. 5.

Figure 10:
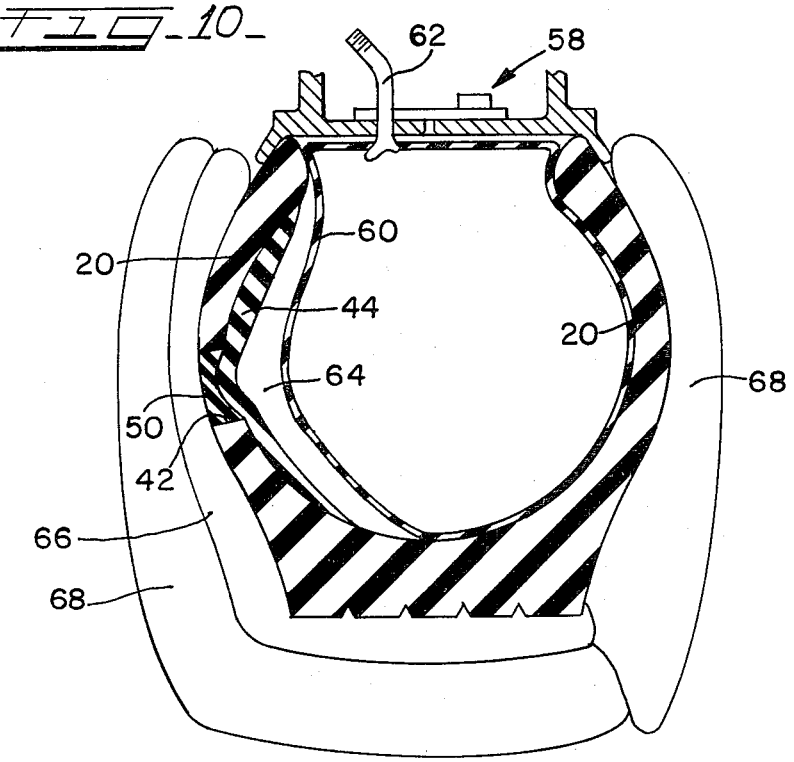
FIG. 10 is a sectional view radially through a tire and associated repair apparatus during the curing step of the method of the present invention, and illustrating the heat pads and air bags used in conjunction therewith.

Referring to FIG. 10, the step of curing patch 44 and uncured plug material 50 is shown in conjunction with apparatus for carrying out this step. More particularly, again the road rim fixture 58 is utilized with inner tube 60 and air valve stem 62. However, an inner heating pad 64 and an outer heating pad 66 are placed on the inside and outside of the tire, respectively. Inner heating pad 64 is disposed between patch 44 and inner tube 60. Air bags 68 are disposed about the exterior of the tire surrounding outer heating pad 66. This apparatus is employed in carrying out the step of the present invention described in conjunction with FIG. 6, wherein a pressure differential between the inside and outside of the tire and patch is maintained during curing of the patch and the plug material. To this end, while heating pads 64, 66 are curing patch 44 and plug material 50, inner tube 60 can be inflated to a first pressure while air bags 68 are inflated to a second pressure. For instance, a pressure differential of 10 p.s.i. can be effected by inflating inner tube 60 on the order of 65 p.s.i. and inflating air bags 68 on the order of 55 p.s.i. This pressure differential has proven effective with the method of the present invention described above when repairing 10.00×20 truck tires with an uncured rubber-nylon cord patch.

Figure 11:
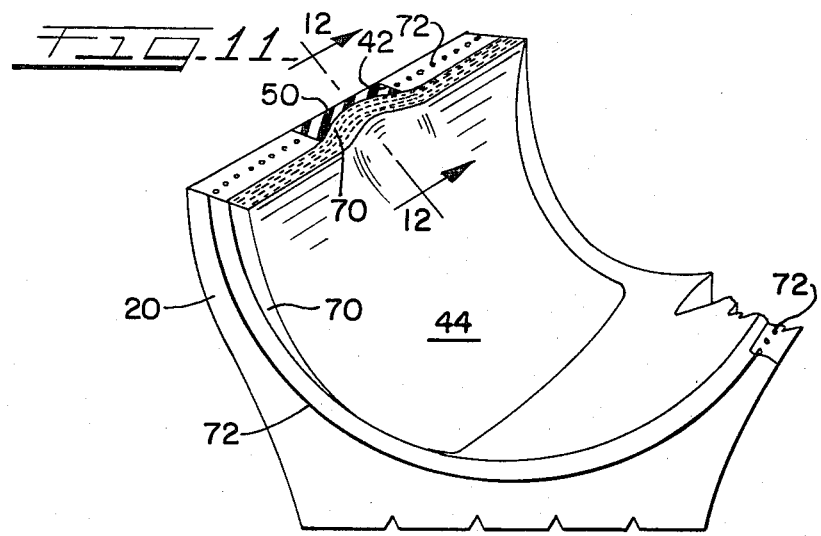
FIG. 11 is a fragmented perspective view, partially in section, of a tire repaired in accordance with the present invention.
Figure 12:
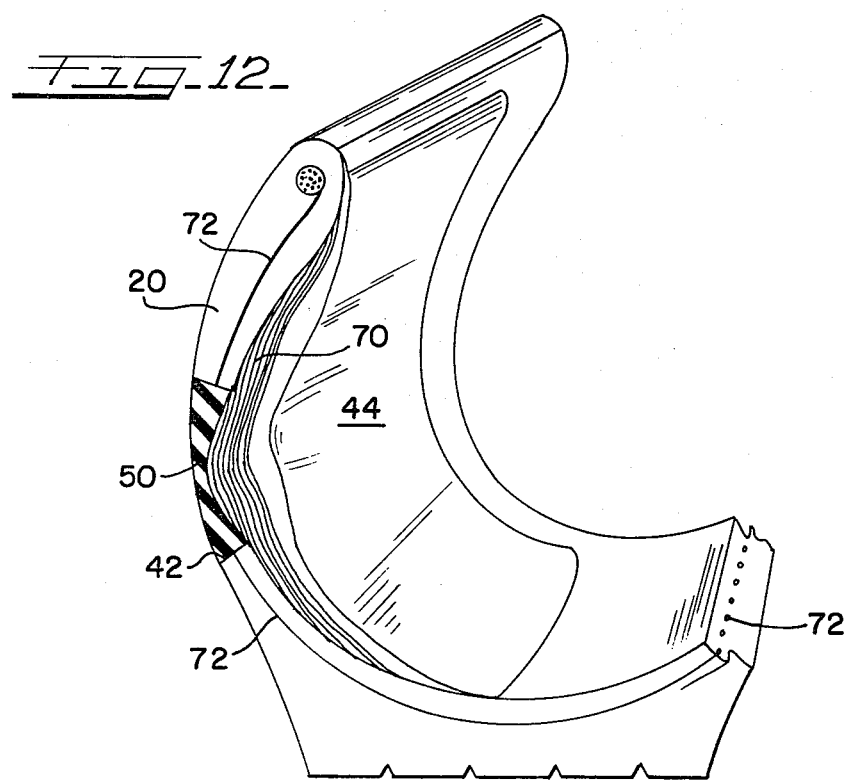
FIG. 12 is a fragmented perspective view, partially in section, of the repaired tire of FIG. 11, taken generally along the line 12—12.

Referring to FIGS. 11 and 12, these views illustrate the completed repair construction in accordance with the present invention and show the orientation of the cords in patch 44 and the cords in the sidewalls 20 of the repaired tire. It should be noted that proper cross-hatching of the rubber tire and patch materials is omitted to better facilitate the illustration. It can be seen that cords 70 in patch 44 are oriented or extend in the same radial direction or parallel to cords 72 of the tire. FIG. 11 shows a section through the repaired tire generally along the line 11—11 of FIG. 2, and FIG. 12 shows a radial section through the repaired tire generally along line 12—12 of FIG. 11. The position and concave orientation of patch 44 in plug area 42 also is shown and illustrates that the cords, themselves, of the patch are also in a generally concave configuration at the repair area.

A synopsis of the repair construction and method of the present invention will now be described using a 10.00×20 radial cord truck tire by way of example. In practice, the damaged tire will first be inspected, and, upon locating the injury, the damaged portion of the tire is skived to remove a section of the wall of the tire around the damaged portion to form a plug area 42. The plug area and the surrounding inside and outside surfaces to be covered by the patch and plug material are then buffed and coated with a conventional rubber cement. An uncured patch 44, such as a six-ply nylon cord patch, is installed over the plug area on the inside of the tire in an unstressed state (FIG. 4). An inner tube is installed within the tire, over the installed patch, and the tire is mounted on a road rim fixture (FIG. 8). The tube is inflated, on the order of 65-75 p.s.i., to position the patch at least partially within the plug area and in preferably a generally concave orientation (FIG. 5). The remainder of plug area 42 then is filled with a suitable uncured plug material, such as uncured rubber (FIG. 6). The inner tube is deflated and the heating pads and air bags are installed as illustrated in FIG. 9. Alternatively, the inside heating pad can be inserted with the inner tube before the pre-positioning of the patch, in which case a higher pressure will be required, on the order of 100 p.s.i., to position the patch within the plug area. This approach, of course, eliminates the need to deflate the inner tube and insert the heating pad prior to curing. The patch and plug material are then cured while maintaining a differential pressure between the inside and outside of the tire by properly inflating inner tube 60 and air bags 68 (FIG. 9). As stated above, a pressure differential on the order of 10 p.s.i. (65 p.s.i. inside and 55 p.s.i. outside) has proven effective. The tire is then preferably maintained in inflated condition for a post cure period, for instance one hour, and then deflated and the inside heating pad 64 is removed. The tire then is removed from the road rim fixture for final inspection and dressing of the exterior of the repair construction to form a flush continuation of the outside profile of the tire wall across the plug area.

Thus, it can be seen that a new and improved repair construction and method has been provided for repairing a damaged portion in the wall of a tire, such as the sidewall of a radial tire, without effecting an outward bulge at the repair on the exterior of the tire after the repair is completed and under normal road running conditions. It has been found that injuries a various dimensions ranging from circumferential slashes of 1.5×0.25 inches to radial slashes of 6.00×0.38 inches may be repaired. Indeed, a typically troublesome sidewall injury of 2.5 inches (radially) by 0.75 inches (circumferentially) can be effectively repaired by the practice of the present invention.

It will be understood that the invention may be embodied in other specific forms without departing from the spirit or central characteristics thereof. The present examples and embodiments, therefor, are to be considered in all respects as illustrative and not restrictive, and the invention is not to be limited to the details given herein. For example, only a localized area adjacent the repair need be pressurized and not the entire tire during the pre-positioning and curing steps. All of these modifications or other forms are intended to be covered by the appended claim.

What is claimed is:

1. A reconditioned radial tire having a plurality of radially oriented casing cords and including at least one sidewall injury area in which one or more of said cords have been severed, said injury area being repaired by a composite construction comprising a patch applied on the inner surface of said sidewall and a plug material filling the remainder of said injury area on the outside of said patch; said patch having a plurality of reinforcing cords oriented radially of the tire and generally parallel to said tire cords; and a portion of said patch including at least some of said reinforcing cords extending outwardly beyond the plane of said sidewall inner surface into the injury area of said sidewall and having a generally concave orientation within said injury area to impede deformation of said composite construction when said tire is inflated to normal operating pressure.

2. The reconditioned tire of claim 1 wherein said patch extends over a peripheral area of said tire sidewall, and said patch has a greater density of reinforcing cords in the area defined by said damaged portion than in said peripheral area.

3. A method of repairing a damaged portion in the sidewall of a radial tire wherein the tire includes a plurality of casing cords disposed generally radially between the beads of the tire, and wherein the damaged portion includes one or more severed casing cords, comprising the steps of:

removing a section of said sidewall around said damaged portion including at least a part of the damaged casing cords to form a plug area;

installing a patch having a plurality of reinforcing cords embedded therein over said plug area on the inside of said tire, said patch being disposed such that its reinforcing cords are aligned generally parallel to said casing cords;

pressurizing the interior of the tire to at least about 60% of the tire's normal operating pressure and for a time sufficient to position the patch at least partially within the damaged portion defined by said plug area and between the inside and outside surfaces of said sidewall and to shape the patch to impede deformation of the patch when subjected to internal tire pressure subsequent to curing the repair;

applying a plug material to the remainder of the damaged portion defined by said plug area on the outside of the patch while maintaining the patch in said position and shape; and curing the patch and plug material while maintaining the patch in said position and shape.

4. The method of claim 3 wherein said curing step is effected with both the interior and exterior of said tires pressurized adjacent to said plug area, and wherein said interior pressure is greater than said exterior pressure by an amount sufficient to maintain the patch in said position at least partially within said plug area.

5. The method of claim 4 wherein said curing step is effected with the interior of the tire inflated to a pressure on the order of approximately 10% to 35% greater than the pressure on the outside of the tire.

6. The method of claim 3 wherein the interior of the tire is pressurized to approximately 60% to 100% of the tire's normal operating pressure to maintain the position of said patch during said curing step.

7. The method of claim 3 wherein said plug material is a natural or synthetic rubber.

8. The method of claim 3 wherein said patch comprises a plurality of reinforcing cords embedded in uncured natural or synthetic rubber.

9. The method of claim 3 wherein said patch comprises a plurality of reinforcing cords embedded in semi-cured natural or synthetic rubber.

10. The method of claim 3 wherein said patch comprises a plurality of reinforcing cords embedded in cured natural or synthetic rubber.

11. The method of claim 3 wherein said patch is shaped during said pressurizing step to assume a generally concave orientation within said plug area.

12. A method of repairing a damaged portion in the sidewall of a radial tire wherein the tire includes a plurality of casing cords disposed generally radially between the beads of the tire, and wherein the damaged portion includes one or more severed casing cords, comprising the steps of:

removing a section of said sidewall around said damaged portion including at least a part of the damaged casing cords to form a plug area;

installing a patch having a plurality of reinforcing cords embedded therein over said plug area on the inside of said tire, said patch being disposed such that its reinforcfing cords are aligned generally parallel to said casing cords;

pressurizing the interior of the tire to at leaast about 60% of the tire's normal operating pressure and for a time sufficient to position the patch at least partially within the damaged portion defined by said plug area and between the inside and outside surfaces of said sidewall and to shape the patch to impede deformation of the patch when subjected to internal tire pressure subsequent to curing the repair;

applying a plug material to the remainder of the damaged portion defined by said plug area on the outside of the patch while maintaining the patch in said position and shape; and curing the patch and plug material while maintaining the patch in said position and shape;

said pressurizing and curing steps causing at least a portion of the patch reinforcing cords to migrate toward said plug area so that the repaired tire has an increased density of patch reinforcing cords in the plug area of the repair.

* * * * *